July 15, 1930.    G. F. HORSLEY    1,770,779
PRODUCTION OF ESTERS
Filed Aug. 9, 1928

Inventor:-
George Frederick Horsley
by Steward & McKay
his attorneys

Patented July 15, 1930

1,770,779

UNITED STATES PATENT OFFICE

GEORGE FREDERICK HORSLEY, OF HIGHFIELD EAGLESCLIFF, ENGLAND, ASSIGNOR TO IMPERIAL CHEMICAL INDUSTRIES, LIMITED, OF LONDON, ENGLAND, A BRITISH COMPANY

PRODUCTION OF ESTERS

Application filed August 9, 1928, Serial No. 298,592, and in Great Brtiain August 3, 1927.

This invention relates to a process for the continuous production of esters, and consists in supplying alcohol, acid, and water to an esterification apparatus in such proportion as to enable substantially all of the ester produced to be continuously eliminated in the form of a low-boiling azeotropic vapour, consisting of ester, water and alcohol with only traces of acid. Ordinary esterification practice aims at performing the reactions under such conditions that the concentrations of the reactants are as large as possible, while the concentrations of resultants (i. e. ester and water) are kept as low as possible, either by continuously distilling off these products or by fixing the water chemically e. g. by sulphuric acid. I have found however that it is advantageous to remove the ester and water continuously, in the form of a ternary azeotropic mixture, but at the same time to add a certain amount of water, containing possibly some ester, to the esterification vessel. The addition of a certain amount of the resultants to the system permits the formation of the azeotropic vapour which, according to the invention, acts as a medium for the removal of ester and water. Thus ester and water are continuously removed from the still, while a certain amount of water containing possibly some ester is continuously added thereto.

In order that the invention may be clearly understood the manner of its application to the production of butyl acetates particularly iso-butyl acetate, will be explained. The accompanying diagram illustrates two methods of carrying out the manufacture of isobutyl acetate according to the invention.

Figure 1:
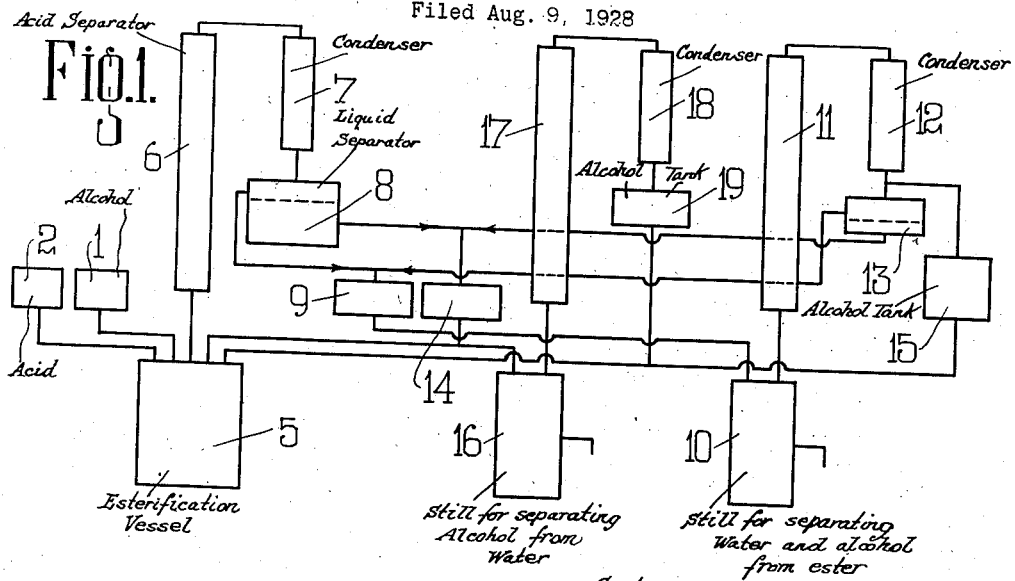

In Figure 1, 5 represents a steam heated esterification vessel or still, containing a bulk of isobutyl alcohol. Fresh isobutyl alcohol and acetic acid are added from storage tanks 1 and 2 respectively. Certain other liquids from other parts of the plant are also returned to the still 5, including an amount of water sufficient to permit of the formation of the azeotropic vapour. The liquid in the still preferably contains a little catalyst to accelerate the esterification, e. g. phosphoric acid, and the temperature is maintained at such a degree that the ester produced by the reaction is continuously distilled off in the form of an azeotropic mixture of ester, alcohol and water, which in the case of isobutyl acetate, isobutyl alcohol and water boils at about 87° C. and has the following composition:—

|  | Per cent by weight |
|---|---|
| Isobutyl acetate | 57.2 |
| Isobutyl alcohol | 20.2 |
| Water | 22.6 |

The vapours of this ternary mixture pass off and are dephlegmated in a column 6 and condensed in a condenser 7. The little acetic acid that may leave the still is practically all returned by the action of the dephlegmator 6. It will be observed that the proportion of water contained in the ternary vapour is so great that the water produced during the esterification is not sufficient to supply the whole quantity required to carry off all the ester. Hence it is necessary to add water to the still either as such, or in solution in the raw materials, or as aqueous distillates produced elsewhere in the plant.

It is thus permissible in our process to use isobutyl alcohol and acetic acid each of about 80% strength and containing 20% of water, and it may be necessary to add further water over and above the amount so introduced.

The condensate obtained in 7 is sent to a vessel 8, where it separates of its own accord into two layers, the upper layer containing the greater part of the ester, and the lower layer containing the bulk of the water. The two layers have the following compositions:—

1. *Upper layer (=80% of total condensate)*

|  | Per cent by weight |
|---|---|
| Isobutyl acetate | 71 |
| Isobutyl alcohol | 24.4 |
| Water | 4.6 |

2. *Lower layer (=20% of total condensate)*

|  | Per cent by weight |
|---|---|
| Isobutyl acetate | 0.6 |
| Isobutyl alcohol | 3.1 |
| Water | 96.3 |

These two layers are run to collecting vessels 9 and 14 and are then treated separately so as to recover the valuable ester and alcohol. This treatment may follow a discontinuous or batch process, or with modifications of plant it may be rendered continuous, in the manner described later.

The separation into two layers is advantageously effected at a high temperature, as the mutual solubilities are then somewhat lower.

In case the azeotropic vapour is accompanied by traces of acetic acid, the upper layer of the condensate may be neutralized by sodium carbonate before distillation, so as to produce an acid free ester.

The top layer is sent from the collecting vessel 9 to a still 10, where the water and alcohol together with some ester are distilled off leaving pure ester in the still. The first distillate from 10, consisting of ternary vapour boiling at 87° C., is dephlegmated in 11 and condensed in a condenser 12, the condensate being collected in a vessel 13, where it separates into two layers. The upper layer is sent back into the vessel 9, whilst the lower layer is sent to join the liquid collected in 14, these liquids being identical in composition.

When all the water has been expelled from the liquid in the still 10, the binary vapour boiling at 107° C., and consisting of isobutyl alcohol and isobutyl ester, is distilled until all the alcohol has been expelled. The vapours are dephlegmated, condensed and separated in a vessel 15 to be run back into the original still 5.

The lower layer from 8 is submitted to distillation in a still 16, from which a volatile vapour is driven off at 90° C, as long as any alcohol remains in the liquid. The vapours are dephlegmated in 17, condensed in 18 and the condensate collected in 19 is returned to the still 5. Pure water collects in 16.

Part of the liquid in 14 may be sent straight back to 5 in order to make up the amount of water required therein.

It will be seen that in this embodiment of the invention, alcohol, acid, water and a little ester are supplied to the still 5, while pure ester and water are eliminated from the system at the stills 10 and 16 respectively.

Figure 2:
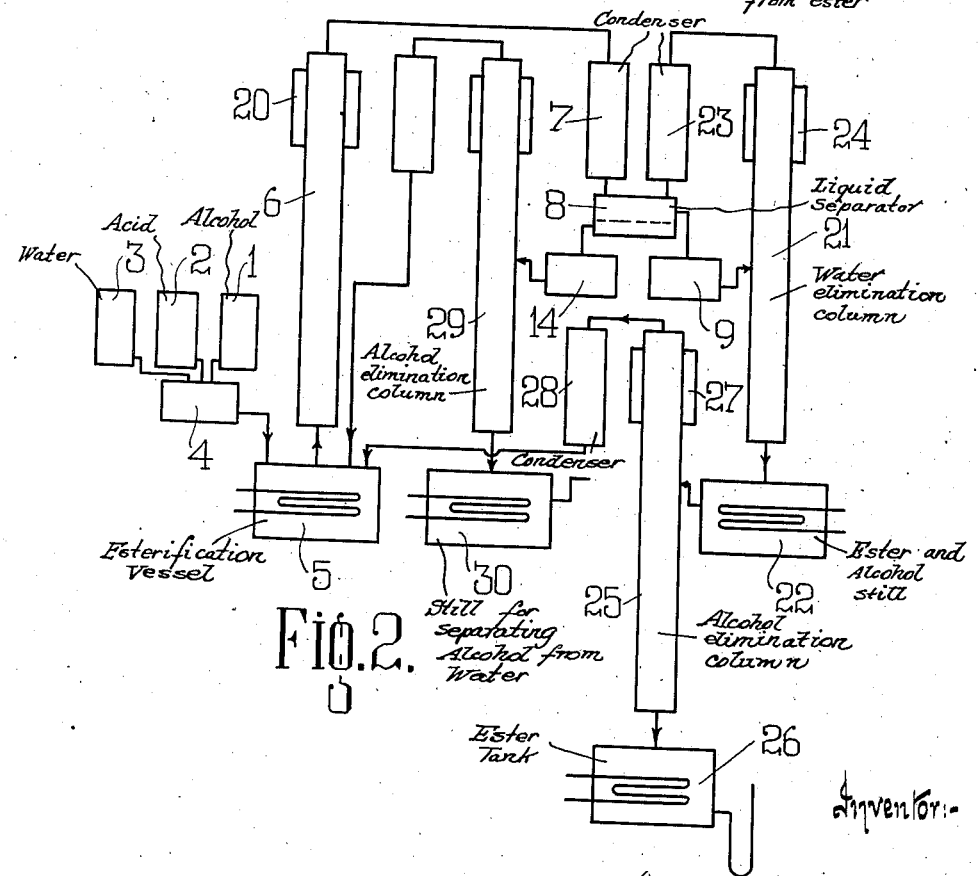

In another form of the invention, the production and isolation of ester may be rendered completely continuous by employing continuous stills having reflux columns, containing vapours adapted to analyse the various fractions of the distillates produced in the esterification. This type of plant is illustrated in Figure 2.

Alcohol, acid and water from vessels 1, 2 and 3 respectively are mixed in the desired proportions in a vessel 4 and the mixture is supplied continuously to a reaction vessel 5 containing a quantity of the alcohol. The vessel 5 is heated by a steam coil to such a temperature that the ester formed from the added materials is continuously boiled off in the form of ternary vapour of ester, alcohol and water.

Certain condensates from different parts of the plant, containing various amounts of ester, alcohol and water are continuously added to the reaction vessel 5, but the quantities of materials added altogether are so coordinated that there is just sufficient water present to carry off substantially all of the ester formed. The liquid in 5 therefore remains constant in composition; it consists of isobutyl alcohol with small amounts of ester, acid and water.

The vapours driven off from 5 are dephlegmated in a column 6, at the upper end of which is arranged a cooling coil or jacket 20 maintained at about 87° C., which is the boiling point of the ternary vapour at atmospheric pressure. The escaping vapours pass to a condenser 7, and the condensate is collected in a vessel 8, where it separates into two layers. The upper layer is run into a collecting vessel 9 and is then introduced into the column 21, which contains the vapour of the binary mixture of isobutyl acetate and isobutyl alcohol together with some ester vapour, the vapour in the column 21 being maintained by boiling a mixture of binary mixture and ester in the vessel 22. As the liquid from 9 trickles down the column 21 the more volatile part is vaporized, while the less volatile part remains as liquid and descends to the vessel 22, the result being that ternary vapour escapes at the top of the column, which is provided with a jacket 24 maintained at 87° C. and is condensed in 23 and added to 8, while the binary mixture and ester remain as liquid and collect in 22. Part of the liquid in 22 is continuously extracted and fed into the column 25 down which it runs into the vessel 26, the more volatile part of the liquid being vaporized in the process, so that when the liquid reaches the vessel 26 it is substantially pure ester. The ester reaching the vessel 26 in this way is partially vaporized by a steam coil and the vapors so formed pass upwardly into the column 25 and cause the more volatile part of the liquid fed in from 22 namely the binary mixture, to be vaporized, while the less volatile part, the ester, remains as liquid and descends to join the liquid in 26, from which part the pure ester is continuously extracted.

The binary vapours leaving the column 25, the top of which is maintained at about 107° C., the boiling point of the binary mixture, by a jacket 27, are condensed in 28 and the condensate is returned to the reaction still 5.

The lower layer of the liquid which separates in 8 is run into a collecting vessel 14; it consists chiefly of water, together with a little alcohol and ester. It is fed into a column 29 supplied with steam from a vessel 30; the alcohol and ester are condensed and returned to 5. The unvaporized water descends to 30 and is rejected continuously.

It will be seen that the operation of this plant is entirely continuous, and moreover the various condensates may distribute themselves in the appropriate manner by gravity. It is only necessary to maintain constant temperatures at the tops of the various columns, constant rates of ebullition in the corresponding stills, and constant rates of feed of raw materials and extraction of resultants.

The upper layer of the liquid separated in the vessel 8, which is rich in ester, may be sent straight to the pure ester column 25 instead of to 21. In this modification (not shown) the liquid from 9 will enter the column 25 at the same point as the liquid from 22, in the above described process and apparatus. Column 21, vessel 22, condenser 23 and heater 24 would be eliminated by such change in process and apparatus. In this case, the vapours escaping from 25 will consist of mixed ternary and binary vapours and may be condensed and the condensate introduced into a column containing pure binary (ester/alcohol) vapour. Ternary vapour will escape from this latter column and may be combined with the original ternary vapour produced in the reaction vessel 5. The binary condensate receiving contributions from the binary column will be returned continuously to the reaction vessel.

These parts of the apparatus which are exposed to the action of phosphoric and acetic acids should be constructed of Staybrite steel. The remainder of the apparatus may be made of copper.

In the appended claims by "esters of the type described" I mean esters forming ternary azeotropic vapours with water and alcohol which are richer in water than the stoichiometric amount (the amount produced by reaction between the alcohol and the acid) and which have a lower boiling point than the pure ester.

I declare that what I claim is:—

1. The process of preparing esters from alcohols and acids which are capable of reacting together to produce with the aid of heat ternary azeotropic vapours of ester, water and an alcohol richer in water than the amount produced by the reaction between the alcohol and the acid by which such esters are formed and which vapours have a lower boiling point than the pure ester, which process comprises continuously supplying to a reaction vessel acid, water and an alcohol, the alcohol added being in excess of that which will combine with the acid, such excess of alcohol and the sum of the amounts of water added and the water formed by the reaction of the alcohol and acid being substantially the amounts of the alcohol and water respectively required to produce with the ester formed the ternary azeotropic vapour of such alcohol, water and ester, and heating the mixture to drive off such vapour continuously.

2. The process as in claim 1 in which the ternary azeotropic vapours are condensed, the condensate separated into substantially aqueous and non-aqueous portions and a portion of the aqueous portion returned to the reaction vessel.

3. The process as in claim 1 in which the ternary azeotropic vapours are condensed, water separated from the condensate and returned to the reaction vessel.

4. The process as in claim 1 in which the ternary azeotropic vapours are condensed, allowing the condensate to separate into substantially aqueous and non-aqueous layers at a high temperature and returning a portion of the aqueous layer to the reaction vessel.

5. The process as in claim 1 which also comprises condensing the ternary azeotropic vapours to a liquid, allowing said liquid to separate into layers, one rich in ester, the other consisting mainly of water, drawing off said layers, running the ester layer into a still, heating the same to drive off firstly an azeotropic vapour consisting of alcohol, water and ester, and secondly an azeotropic vapour consisting of alcohol and ester, and running off the pure ester.

6. The process as in claim 1 in which an esterification catalyst is present.

In witness whereof, I have hereunto signed my name this 25th day of July, 1928.

GEORGE FREDERICK HORSLEY.